(12) United States Patent
Booth et al.

(10) Patent No.: US 7,712,832 B2
(45) Date of Patent: May 11, 2010

(54) VEHICLE SEAT WITH VARIABLE FIRMNESS

(75) Inventors: Daniel W. Booth, Warren, MI (US); Robert L. Demick, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/759,983

(22) Filed: Jun. 8, 2007

(65) Prior Publication Data

US 2008/0303326 A1 Dec. 11, 2008

(51) Int. Cl.
*A47C 7/02* (2006.01)
*A47C 7/14* (2006.01)

(52) U.S. Cl. ............... 297/284.9; 297/284.3; 297/284.2; 297/452.41

(58) Field of Classification Search ............... 297/284.9, 297/452.41, 452.7, 450.27, 284.3, 284.2
See application file for complete search history.

(56) References Cited

U.S. PATENT DOCUMENTS

| | | | |
|---|---|---|---|
| 4,707,027 A | | 11/1987 | Horvath et al. |
| 5,707,109 A | * | 1/1998 | Massara et al. ........... 297/284.9 |
| 5,769,489 A | * | 6/1998 | Dellanno ............... 297/216.14 |
| 5,975,629 A | * | 11/1999 | Lorbiecki .................... 297/200 |
| 6,033,017 A | * | 3/2000 | Elqadah et al. ........... 297/216.1 |
| 6,055,473 A | | 4/2000 | Zwolinski et al. |
| 6,206,474 B1 | * | 3/2001 | Kruse et al. ............. 297/452.41 |
| 6,578,916 B2 | * | 6/2003 | Longhi et al. ............. 297/284.3 |
| 6,739,657 B2 | * | 5/2004 | Heilig et al. .............. 297/216.1 |
| 6,752,454 B2 | * | 6/2004 | Ruel et al. ................ 297/216.1 |
| 6,896,325 B2 | * | 5/2005 | Takedomi et al. ........ 297/216.1 |
| 7,093,898 B2 | * | 8/2006 | Ladron De Guevara .. 297/284.6 |
| 7,219,957 B1 | * | 5/2007 | Khouri .................... 297/216.1 |
| 7,264,271 B2 | * | 9/2007 | Barvosa-Carter et al. .... 280/751 |
| 7,284,792 B1 | * | 10/2007 | Dabney et al. ......... 297/216.11 |
| 7,427,103 B2 | * | 9/2008 | Weber .................... 297/228.13 |
| 2001/0005097 A1 | * | 6/2001 | Heilig et al. ........... 297/452.55 |
| 2002/0047295 A1 | * | 4/2002 | Sullivan et al. .......... 297/216.1 |
| 2003/0023363 A1 | * | 1/2003 | Katz et al. ..................... 701/49 |
| 2003/0222489 A1 | * | 12/2003 | Takedomi et al. ........ 297/216.1 |
| 2006/0231357 A1 | * | 10/2006 | Jolly et al. ................ 188/267.1 |
| 2007/0063566 A1 | * | 3/2007 | Browne et al. ......... 297/344.11 |
| 2007/0080013 A1 | * | 4/2007 | Melz et al. ................... 180/274 |
| 2007/0188004 A1 | * | 8/2007 | Browne et al. .............. 297/391 |
| 2007/0246979 A1 | * | 10/2007 | Browne et al. ......... 297/216.12 |
| 2008/0005843 A1 | * | 1/2008 | Lokhorst et al. ............. 5/655.3 |
| 2009/0218858 A1 | * | 9/2009 | Lawall et al. ............. 297/216.1 |

* cited by examiner

*Primary Examiner*—David Dunn
*Assistant Examiner*—James Alex
(74) *Attorney, Agent, or Firm*—Quinn Law Group, PLLC.

(57) ABSTRACT

A vehicle seat includes a frame, a flexible cover, and a material that is sufficiently mounted with respect to the flexible cover such that the material resists displacement of at least part of the flexible cover with respect to the frame. The material is characterized by a first state in which the material is characterized by a first rigidity, and a second state in which the material is characterized by a second rigidity that is greater than the first rigidity. Thus, the firmness of the seat is selectively variable by causing the material to change between the first and second states. A corresponding method is also provided.

2 Claims, 2 Drawing Sheets

VEHICLE SEAT WITH VARIABLE FIRMNESS

TECHNICAL FIELD

This invention relates to vehicle seats having material characterized by a variable rigidity.

BACKGROUND OF THE INVENTION

A vehicle seat typically includes foam that is compressible to conform to the contours of an occupant so that the occupant is comfortably supported. A flexible covering, such as fabric, leather, or vinyl, covers the foam and forms the outer surface of the seat. A vehicle seat is typically characterized by a lower seat portion and a seatback portion. The lower seat portion defines a generally horizontal surface to support an occupant, and the seatback portion defines a generally vertical surface to support the back of an occupant.

Certain prior art vehicle seats include pneumatic systems to control the firmness of the seat. The pneumatic systems include a bladder within the seat that is selectively pressurized with air to control the firmness of the seat. A system of pumps and valves is employed to pressurize and depressurize the bladder.

SUMMARY OF THE INVENTION

A seat assembly for installation in a vehicle is provided. The seat assembly includes a seat having a frame, a flexible covering, and a material being mounted with respect to the flexible covering such that the material resists displacement of at least part of the flexible covering with respect to the frame. The material is characterized by a first state in which the material has a first rigidity and a second state in which the material has a second rigidity greater than the first rigidity.

The seat assembly provided herein is characterized by variable firmness. When the material is in the first state, it does not resist displacement of the flexible covering as much as when the material is in the second state; thus, the material, and therefore at least part of the seat surface, is firmer in the second state than in the first state. The seat assembly provided herein improves upon the prior art by providing variable firmness without the use of pumps and valves, as required for pneumatic systems.

The seat assembly provided herein also enables more rapid firmness adjustment than prior art seat assemblies, because the material may be configured to change rigidity in response to a stimulus more rapidly than a pneumatic system can activate a pump to alter the pressure inside a bladder. This rapid response enables active control of the seat firmness; during most driving situations, the material may be in the first state so that the seat is soft and compliant for occupant comfort, and when one or more predetermined conditions exist, such as the vehicle acceleration being greater than a predetermined value, the material may be in the second state to provide occupant support.

Accordingly, a corresponding method for controlling the firmness of a seat in a vehicle is also provided. The method includes monitoring the vehicle for at least one predetermined condition, determining whether the at least one predetermined condition exists, and causing the rigidity of a fluid in the seat to change in response to determining that the at least one predetermined condition exists.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
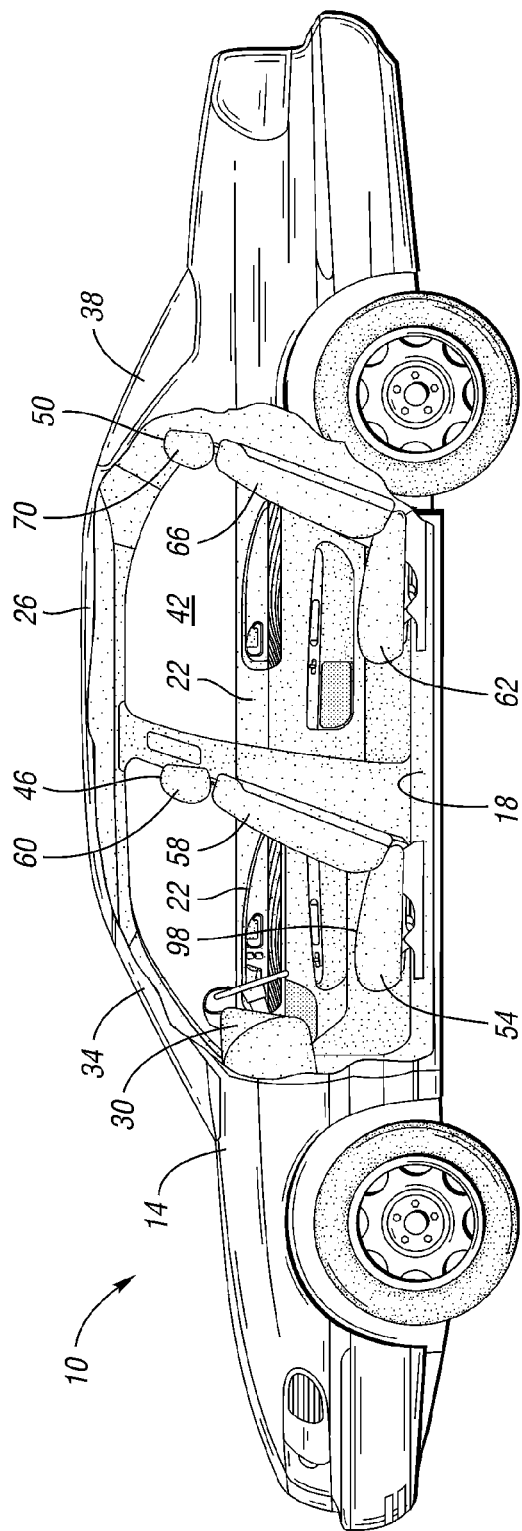
FIG. 1 is a schematic, partial cutaway, side view of a vehicle including seat assemblies having respective lower seat portions, seatback portions, and headrests.

Referring to FIG. 1, a vehicle 10 including a vehicle body 14 is schematically depicted. The vehicle body 14 includes a floor 18, doors 22, a roof 26, an instrument panel 30, a windshield 34, and a rear window 38, all of which cooperate to at least partially define a passenger compartment 42. The vehicle 10 includes front seats 46 and rear seats 50 in the passenger compartment. The front seats 46 include a lower seat portion 54, a seatback portion 58, and a headrest 60, which is also sometimes referred to as a "head restraint." Similarly, the rear seats 50 include a lower seat portion 62, a seatback portion 66, and a headrest 70. Headrests 60, 70 are depicted as separate pieces attached to seatback portions 58, 66, respectively; however, it should be noted that, within the scope of the claimed invention, a headrest may be an integral part of a seatback portion as understood by those skilled in the art. For example, a headrest may be the upper portion of a seatback.

Figure 2:
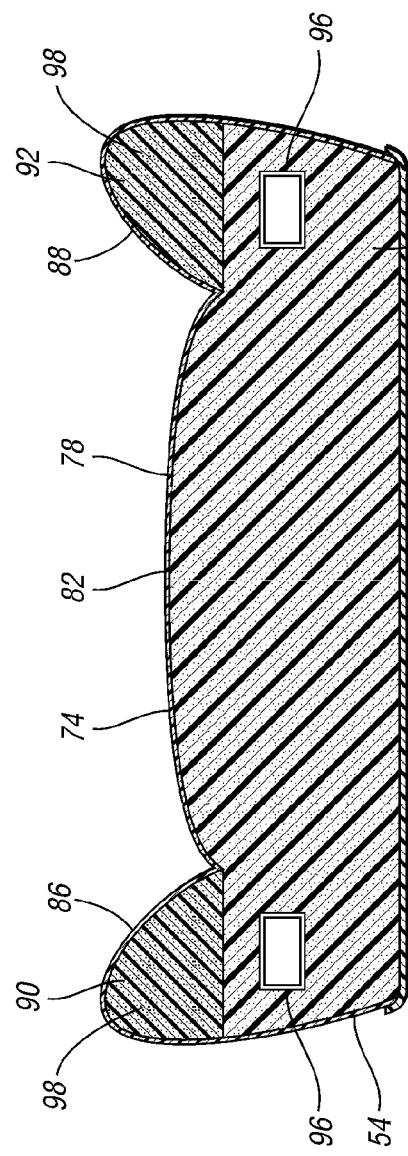
FIG. 2 is a schematic, cross-sectional view of one of the lower seat portions of FIG. 1.

Referring to FIG. 2, wherein like reference numbers refer to like components from FIG. 1, the lower seat portion 54 of front seat 46 is schematically depicted. The lower seat portion 54 includes a flexible outer cover 74 that defines a portion of the outer surface 78 of the lower seat portion 54, including a generally flat, horizontally oriented occupiable surface 82 for supporting an occupant and the outer surfaces 86, 88 of bolsters 90, 92. The bolsters 90, 92 are situated on opposite lateral sides of the occupiable surface 82 to provide lateral support for an occupant. That is, surfaces 86, 88 rise from opposite sides of surface 82 to resist lateral movement of an occupant of the lower seat portion 54.

The lower seat portion 54 also includes a foam cushion 94, which may be formed of a polymeric material, such as polyurethane, as understood by those skilled in the art. The foam cushion 94 covers a rigid seat frame 96 and provides cushioning between an occupant and the frame 96. Members of the frame 96 are depicted surrounded by the foam cushion 94 in the embodiment depicted. However, those skilled in the art will recognize a variety of frame configurations that may be employed within the scope of the claimed invention to provide structural rigidity to a seat and for connecting the seat with respect to a vehicle body.

The flexible cover 74 is operatively connected to the foam cushion 94 via a fastening system (not shown). Those skilled in the art will recognize a variety of fastening systems that may be employed to operatively connect the cover 74 with respect to the cushion 94, such as hog rings, clips, adhesives, and hook and loop fasteners. It should be noted that, within the scope of the claimed invention, a "cover" may be any member that defines at least part of the outer surface of a seat, and may be a single piece or multiple pieces. For example, a cover may include a first piece that defines the outer surfaces of seat bolsters, and a second piece that defines the central seating surface between the bolsters.

Each bolster 90, 92 includes material 98 that is inside the lower seat portion 54 and that is covered by the flexible cover 74. The material 98 is mounted with respect to the frame 96 via the cushion 94, and is mounted with respect to the flexible cover 74 such that the material 98 resists displacement of at least part of the flexible cover 74 and surfaces 86, 88, with respect to the frame 96. More particularly, in the embodiment depicted, when a force is exerted on the flexible cover 74 at the outer surface 86 of bolster 90, the flexible cover 74 transmits at least part of the force to the material 98 of bolster 90, and a corresponding reaction force is exertable by the material 98 of bolster 90 on the flexible cover 74. Similarly, when a force is exerted on the flexible cover 74 at the outer surface 88 of bolster 92, the flexible cover 74 transmits at least part of the force to the material 98 of bolster 92, and a corresponding reaction force is exertable by the material 98 of bolster 92 on the flexible cover 74.

The material 98 is characterized by a first state in which the material has a first rigidity, and a second state in which the material 98 has a second rigidity that is greater than the first rigidity. As used herein, "rigidity" is an intrinsic characteristic of the material, and refers to the resistance of the material to flow or deformation in response to an applied force or pressure. For example, if the material is a fluid, then rigidity may refer to the viscosity of the fluid; if the material is a solid, then rigidity may refer to the elastic modulus of the solid; etc.

Figure 3:
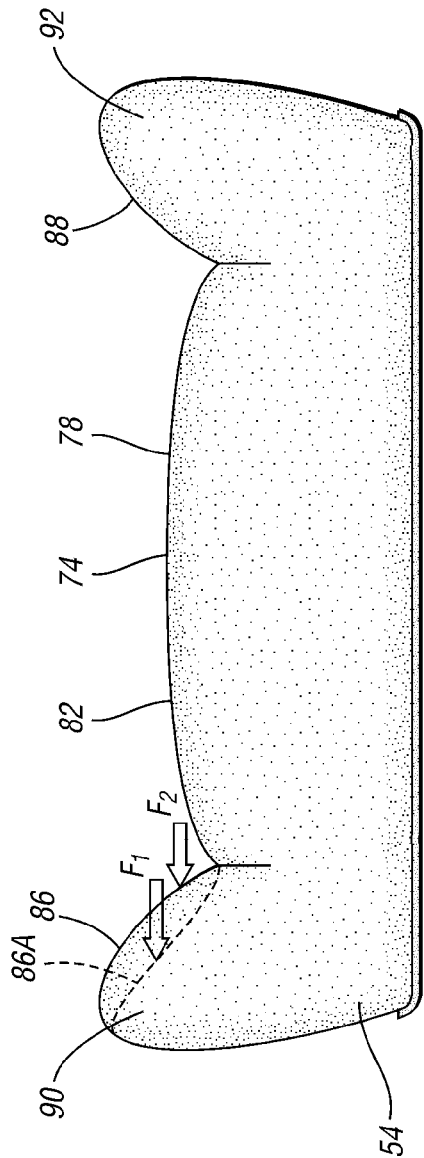
FIG. 3 is a schematic, elevational view of the lower seat portion of FIG. 2.

Referring to FIGS. 2 and 3, when a force $F_1$ is exerted on the flexible cover 74 at surface 86 and the material 98 of bolster 90 is in the first state, the cover 74 transmits at least part of the force $F_1$ to the material 98 so that the material 98 flows or deforms in response thereto, thereby enabling the flexible cover 74 to be deformed such that surface 86 is displaced with respect to the frame 96 from the position shown at 86 to the position shown in phantom at 86A.

When a force $F_2$ having the same magnitude as force $F_1$ is exerted on the flexible cover 74 at surface 86 and the material 98 of bolster 90 is in the second state, the material 98 is more resistant to flow or deformation than in the first state, and accordingly, the material 98 provides more resistance to the displacement and deformation of the flexible cover 74 in the second state than in the first state. In a preferred embodiment, the material 98 is substantially rigid in the second state, and thus the surface 86 is not substantially displaced by the application of force $F_2$, as shown in FIG. 3. The lower seat portion 54 is representative of the construction of the lower seat portion shown at 62 in FIG. 1.

The cover 74 and the material 98 are shown in direct contact with one another in the embodiment depicted. However, and within the scope of the claimed invention, the material 98 may be mounted with respect to the cover 74 indirectly, such as via compressible padding, a rigid member, etc., to resist displacement of the cover 74. Further, and within the scope of the claimed invention, material is mounted with respect to a cover to resist displacement of the cover with respect to a frame if the material is sufficiently positioned with respect to the cover to resist displacement of the cover with respect to the frame in at least one direction. For example, the material 98 may be mounted with respect to the cover 74 such that the material 98 resists displacement of the cover 74 in all directions; alternatively, the material 98 may be mounted with respect to the cover 74 such that the material 98 resists movement of the cover 74 in one direction but permits independent movement of the cover 74 in another direction.

Figure 4:
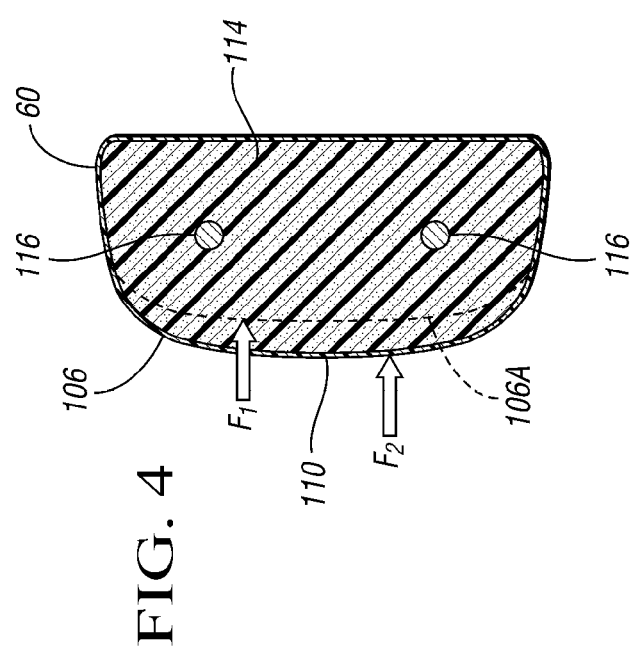
FIG. 4 is a schematic, cross-sectional side view of one of the headrests of FIG. 1.

Referring to FIG. 4, the headrest 60 includes an outer surface 106 that is defined by a flexible cover 110. The headrest 60 also includes material 114 between the flexible cover 110 and a rigid frame 116. The material 114 is similar to the material shown at 98 in FIG. 2. That is, material 114 is characterized by a first state in which the material 114 has a first rigidity, and a second state in which the material 114 has a second rigidity that is greater than the first rigidity. Thus, the material 114 is more resistant to flow or deformation in the second state than in the first state.

The material 114 is mounted with respect to the flexible cover 110 such that the material 114 resists displacement of at least part of the cover 110, and surface 106, with respect to the frame 116. When a force is exerted on the flexible cover 110 at the outer surface 106 of the headrest, the flexible cover 110 transmits at least part of the force to the material 114, and a corresponding reaction force is exertable by the material 114 on the flexible cover 110.

When a force $F_1$ is exerted on the flexible cover 110 at surface 106 and the material 114 is in the first state, the cover 110 transmits at least part of the force $F_1$ to the material 114 so that the material 114 flows or deforms in response thereto, thereby enabling the flexible cover 110 to be deformed such that surface 106 is displaced with respect to the frame 116 from the position shown at 106 to the position shown in phantom at 106A.

When a force $F_2$ having the same magnitude as force $F_1$ is exerted on the flexible cover 110 at surface 106 and the material 114 is in the second state, the material 114 is more resistant to flow and deformation than in the first state, and accordingly, the material 114 provides more resistance to the displacement and deformation of the flexible cover 110 in the second state than in the first state. In a preferred embodiment, the material 114 is substantially rigid in the second state, and thus the surface 106 is not substantially displaced by the application of force $F_2$, as shown in FIG. 4. The headrest 60 is representative of the headrest shown at 70 in FIG. 1.

Referring to FIGS. 2 and 4, those skilled in the art will recognize a variety of materials that may be used to form covers 74, 110 within the scope of the claimed invention, such as fabric, leather, vinyl, etc. In an exemplary embodiment, material 98, 114 is a fluid or gel that is impregnated into foam. Alternatively, and within the scope of the claimed invention, the material 98, 114 may be impregnated into the flexible covers 74, 110, contained in a non-permeable bladder, embedded into the molecular structure of foam, etc.

In a first exemplary embodiment, the material 98, 114 is a shear thickening fluid that is in the first state when the shear rate of the material 98, 114 is below a predetermined amount and that is in the second state when the shear rate of the material 98, 114 is above the predetermined amount. Thus, for example, if material 98 is a shear thickening fluid, then the bolsters 90, 92 may be soft and compliant during most driving situations, but become rigid to support an occupant when the vehicle is in a turn, i.e., when the lateral acceleration of the vehicle causes lateral forces between an occupant and the surfaces 86, 88 of bolsters 90, 92 sufficient to cause the shear rate of the material 98 to exceed the predetermined amount.

Exemplary shear thickening fluids include small, hard particles, such as silica or ceramics, suspended in a fluid, such as silicone oil. The particles, which slide past each other to allow the fluid to flow when the shear rate is below the predetermined amount, become jammed together when the shear rate is above the predetermined amount, thus causing the fluid to become more rigid. The stiffness achieved by the material in the second state may be controlled by the composition of the shear thickening fluid.

An exemplary shear thickening fluid may be created by heating silicone oil comprised of silicone-oxygen-silicone chains. Those skilled in the art will recognize a variety of shear thickening fluids that may be employed within the scope of the claimed invention. An exemplary, commercially available shear thickening material is ReAsorb, from Impact Innovative Products, LLC, of Irwin, Pa. Other exemplary, commercially available shear thickening materials are available from d3o lab of Hove, England.

In a second exemplary embodiment, the material 98, 114 is a magnetorheological (MR) fluid. Magnetorheological fluids are substances that exhibit a change in their flow or theological characteristics in response to an applied magnetic field. MR fluids are typically noncolloidal suspensions of finely divided (typically one to 100 micron diameter) low coercivity, magnetizable solids such as iron, nickel, cobalt, and their magnetic alloys dispersed in a base carrier liquid such as a mineral oil, synthetic hydrocarbon, water, silicone oil, esterified fatty acid or other suitable organic liquid. MR fluids typically have a relatively low viscosity in the absence of a magnetic field but display large increases in their dynamic yield stress when they are subjected to a magnetic field of, e.g., about one Tesla.

A typical MR fluid in the absence of a magnetic field has a readily measurable viscosity that is a function of its vehicle and particle composition, particle size, the particle loading, temperature and the like. However, in the presence of an applied magnetic field, the suspended particles appear to align or cluster and the fluid drastically thickens or gels. Its effective viscosity then is very high and a larger force, termed a yield stress, is required to promote flow in the fluid.

In a third exemplary embodiment, the material 98, 114 is an electrorheological fluid. Electroheological fluids are substances that exhibit a change in their flow or rheological characteristics in response to an applied electric field.

Figure 5:
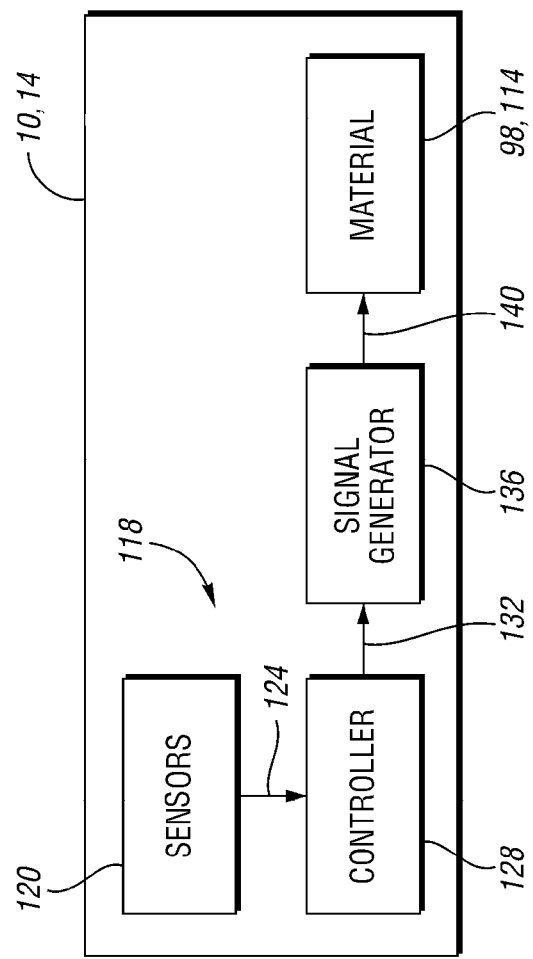
FIG. 5 is a schematic depiction of a seat firmness control system for use in the vehicle of FIG. 1.

Referring to FIG. 5, wherein like reference numbers refer to like components from FIGS. 1-4, the vehicle 10 may include a seat firmness control system 118 for altering the rigidity of material 98, 114 in the seat assemblies. The control system includes a plurality of sensors 120 operatively connected to the vehicle body 14. Each of the sensors 120 is configured to monitor a condition of the vehicle 10, which may include any of the vehicle's components and the vehicle's operating environment. Each of the sensors 120 is configured to transmit sensor signals 124 indicative of the condition to a controller 128.

The controller 128 is programmed and configured to determine whether the sensor signals 124 indicate whether one or more predetermined conditions exist and, to transmit a signal 132 to a signal generator 136 if the sensor signals 124 indicate that the one or more predetermined conditions exist. The signal generator 136 is configured to transmit an activation signal 140 to the material 98, 114 in the vehicle seats in response to the signal 132 from the controller 128. The material 98, 114 alters rigidity in response to the activation signal 140. If the material 98, 114 is an MR fluid, then the signal generator 136 may be an electromagnet, and the activation signal 140 is a magnetic field. If the material 98, 114 is an electrorheological fluid, then the activation signal 140 is an electric field.

In a preferred embodiment, sensors 120 include accelerometers that measure the acceleration (e.g., linear, lateral) of the vehicle, or parts thereof, and the one or more predetermined conditions include the absolute value of the acceleration of the vehicle, or a part thereof, being greater than a predetermined amount. Thus, the seat firmness control system 118 is configured to cause the rigidity of the material 98, 114 to increase when the absolute value of the acceleration is greater than the predetermined amount. The sensors 120 may be part of a vehicle impact detection system, and the controller 128 may be configured such that signal 132 is transmitted when the sensors 120 indicate that a vehicle impact has occurred. Alternatively, and within the scope of the claimed invention, the sensors 120 may be part of a collision avoidance system such that the activation signal 140 is generated when the controller 128 determines, based on signals 124, that one or more conditions indicative of an elevated risk of vehicle impact are present. Sensors 120 may also include, for example, pitch or yaw sensors.

While the best modes for carrying out the invention have been described in detail, those familiar with the art to which this invention relates will recognize various alternative designs and embodiments for practicing the invention within the scope of the appended claims.

The invention claimed is:

1. A seat assembly for installation in a vehicle comprising:
a seat including a frame and a flexible cover;
said flexible cover defining an occupiable surface;
said seat including two bolsters protruding from opposite sides of the occupiable surface;
said flexible cover at least partially defining the outer surfaces of the bolsters; and
material comprising shear thickening fluid and being characterized by a first state in which the material is characterized by a first rigidity and a second state in which the material is characterized by a second rigidity greater than the first rigidity, said material being mounted with respect to the flexible cover such that the material resists displacement of at least part of the outer surfaces of the bolsters with respect to the frame.

2. A vehicle comprising:
a vehicle body defining a passenger compartment;
a vehicle seat mounted with respect to the body and at least partially disposed within the passenger compartment;
said seat including a frame, a flexible cover, and material mounted with respect to the cover to resist displacement of at least part of the cover with respect to the frame; and
said material being characterized by a first state in which the material has a first rigidity and a second state in which the material has a second rigidity greater than the first rigidity;
wherein the material comprises shear thickening fluid;
wherein the vehicle seat includes two seat bolsters spaced laterally apart from one another;
wherein the flexible cover at least partially defines the outer surfaces of the seat bolsters; and
wherein the material is mounted with respect to the flexible cover such that the material resists displacement of at least part of the outer surfaces of the seat bolsters with respect to the frame.

* * * * *